US011695658B2

(12) United States Patent
Li et al.

(10) Patent No.: US 11,695,658 B2
(45) Date of Patent: Jul. 4, 2023

(54) PROCESSING PACKET

(71) Applicant: NEW H3C TECHNOLOGIES CO., LTD., Hangzhou (CN)

(72) Inventors: Wenqun Li, Beijing (CN); Weiwei Guo, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 17/816,535

(22) Filed: Aug. 1, 2022

(65) Prior Publication Data

US 2022/0376996 A1 Nov. 24, 2022

Related U.S. Application Data

(62) Division of application No. 16/464,153, filed as application No. PCT/CN2017/113343 on Nov. 28, 2017, now Pat. No. 11,463,332.

(30) Foreign Application Priority Data

Nov. 29, 2016 (CN) .......................... 201611075281.2

(51) Int. Cl.
*G06F 15/173* (2006.01)
*H04L 43/04* (2022.01)
(Continued)

(52) U.S. Cl.
CPC ............. *H04L 43/04* (2013.01); *H04L 41/12* (2013.01); *H04L 67/125* (2013.01); *H04W 4/70* (2018.02); *H04W 24/04* (2013.01); *H04W 88/08* (2013.01)

(58) Field of Classification Search
CPC ....... H04L 43/04; H04L 41/12; H04L 67/125; H04W 4/70; H04W 24/04; H04W 88/08
(Continued)

(56) References Cited

U.S. PATENT DOCUMENTS

2010/0097995 A1* 4/2010 Murphy ............... H04W 12/086
370/328
2014/0056203 A1 2/2014 Lissianoi et al.
(Continued)

FOREIGN PATENT DOCUMENTS

| CN | 102355682 | 2/2012 |
|---|---|---|
| CN | 103095747 | 5/2013 |

(Continued)

OTHER PUBLICATIONS

Extended European Search Report issued in corresponding European Application No. 17876573.1, dated Oct. 21, 2019.
(Continued)

*Primary Examiner* — Vivek Srivastava
*Assistant Examiner* — Karina J Garcia-Ching
(74) *Attorney, Agent, or Firm* — Norton Rose Fulbright US LLP

(57) ABSTRACT

Methods of processing a packet, APs, ACs and non-transitory machine-readable storage mediums are provided in examples of the present disclosure. In one aspect, an AP receives an Internet-of-Things data packet sent by an Internet-of-Things sensor, wherein a sensor identifier of the Internet-of-Things sensor is carried in the Internet-of-Things data packet; and sends the received Internet-of-Things data packet to an AC such that the AC processes the Internet-of-Things data packet based on the sensor identifier.

7 Claims, 5 Drawing Sheets

(51) Int. Cl.
*H04W 4/70* (2018.01)
*H04L 41/12* (2022.01)
*H04L 67/125* (2022.01)
*H04W 24/04* (2009.01)
*H04W 88/08* (2009.01)

(58) Field of Classification Search
USPC .......................................................... 709/223
See application file for complete search history.

(56) References Cited

U.S. PATENT DOCUMENTS

| | | | | |
|---|---|---|---|---|
| 2016/0073395 | A1* | 3/2016 | Liberg | H04W 68/02 |
| | | | | 370/329 |
| 2016/0094421 | A1* | 3/2016 | Bali | H04L 67/56 |
| | | | | 709/223 |
| 2017/0257767 | A1 | 9/2017 | Zhao et al. | |

FOREIGN PATENT DOCUMENTS

| | | |
|---|---|---|
| CN | 103152368 | 6/2013 |
| CN | 104144466 | 11/2014 |
| CN | 105933432 | 9/2016 |
| JP | 2013065081 | 4/2013 |
| JP | 2015088906 | 5/2015 |
| JP | 2015162876 | 9/2015 |
| JP | 2016511483 | 4/2016 |
| JP | 2016525748 | 8/2016 |
| WO | WO 2015/131689 | 9/2015 |

OTHER PUBLICATIONS

International Search Report and Written Opinion issued in Corresponding International Patent Application No. PCT/CN2017/113343; dated Jan. 22, 2018.
Office Action issued in Corresponding Japanese Application No. 2019-528579, dated Apr. 7, 2020 (English Translation provided).
Office Action issued in Corresponding Japanese Application No. 2019-528579, dated Oct. 13, 2020 (English Translation provided).

* cited by examiner

PROCESSING PACKET

CROSS REFERENCE TO RELATED APPLICATIONS

This application is a divisional of U.S. patent application Ser. No. 16/464,153, filed on May 24, 2019, entitled "PROCESSING PACKET", which is a national phase under 35 U.S.C. § 371 of International Application No. PCT/CN2017/113343, filed on Nov. 28, 2017, which is based on and claims priority to and benefit of Chinese Patent Application No. 201611075281.2, filed with China National Intellectual Property Administration (CNIPA) of People's Republic of China on Nov. 29, 2016, and entitled "METHOD AND DEVICE FOR PROCESSING PACKET". The entire contents of all of the above-identified applications are incorporated herein by reference.

BACKGROUND

An Internet of Things is a network where things are linked together. In the Internet of Things, thing information can be collected by means of an information sensing device (e.g., an Internet-of-Things sensor) to achieve intelligent recognition, positioning, tracking, monitoring and management for things.

DETAILED DESCRIPTION OF THE EMBODIMENTS

The technical solutions of embodiments of the present disclosure will be described clearly and fully below in combination with drawings in the embodiments of the present disclosure. It is apparent that the described embodiments are merely part of embodiments of the present disclosure rather than all embodiments. Other embodiments achieved by those of ordinary skill in the art based on the embodiments in the present disclosure without paying creative work shall all fall into the scope of protection of the present disclosure.

In an Internet of Things based on a Wireless Local Area Network (WLAN), an Access Point (AP) has a built-in Internet-of-Things sensor. The AP processes Internet-of-Things data received from the Internet-of-Things sensor. Processing modules corresponding to different Internet-of-Things sensors on the AP are desired, which causes that a large amount of AP hardware resources are occupied.

A method of processing a packet is provided in an example of the present disclosure. In the method, an AP allocates a sensor identifier for an Internet-of-Things sensor and sends an Internet-of-Things data packet received from the Internet-of-Things sensor and including the sensor identifier to an Access Controller (AC), such that the AC processes the Internet-of-Things data packet based on the sensor identifier.

Figure 1:
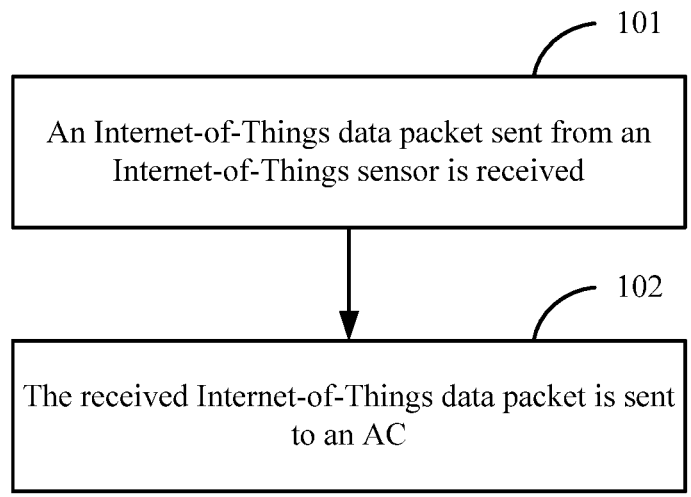
FIG. 1 is a flowchart illustrating a method of processing a packet based on an example of the present disclosure.

FIG. 1 is a flowchart illustrating a method of processing a packet based on an example of the present disclosure. In the method, a process that an AP processes a packet is described as follows.

At block 101, an Internet-of-Things data packet sent from an Internet-of-Things sensor is received.

In the example of the present disclosure, the AP establishes a connection with the Internet-of-Things sensor, and sends a sensor identifier allocated to the Internet-of-Things sensor to the Internet-of-Things sensor. The sensor identifier is carried in the Internet-of-Things data packet from the Internet-of-Things sensor.

In an example, the sensor identifier may be allocated for the Internet-of-Things sensor by an AP or another device, which is not limited herein.

At block 102, the received Internet-of-Things data packet is sent to an AC.

At the block, the AP does not parses the Internet-of-Things data packet, and forwards the Internet-of-Things data packet to the AC, such that the AC processes the Internet-of-Things data based on the sensor identifier carried in the Internet-of-Things data packet. Thus, the resources occupation for the AP can be minimized, and processing stress for the AP can be reduced.

Further, the AP may allocate a virtual sub-card identifier for the Internet-of-Things sensor and record a correspondence between the sensor identifier and the virtual sub-card identifier corresponding to the Internet-of-Things sensor. In an example, a virtual sub-card may be a control module for a physical sensor. The AC may send a management instruction to the virtual sub-card so as to manage a physical sensor corresponding to the virtual sub-card, such as checking a status of the Internet-of-Things sensor, and shutting down/starting up the Internet-of-Things sensor. For example, the AC may send a physical sensor shutdown command carrying the virtual sub-card identifier to the AP so as to shut down the physical sensor corresponding to the virtual sub-card. The AP forwards the received physical sensor shutdown command to the virtual sub-card based on the virtual sub-card identifier, and the virtual sub-card shuts down the corresponding physical sensor based on the physical sensor shutdown command.

A correspondence between the virtual sub-card identifier corresponding to the Internet-of-Things sensor and an interface identifier of an interface connected with the Internet-of-Things sensor may be sent to the AC, such that the AC generates a topology of the AP and a virtual sub-card based on the correspondence between the virtual sub-card identifier and the interface identifier.

When the AP receives the Internet-of-Things data packet from the Internet-of-Things sensor in block 101, the AP may obtain the corresponding virtual sub-card identifier based on the sensor identifier carried in the Internet-of-Things data packet and the correspondence between the sensor identifier and the virtual sub-card identifier recorded in the AP and send the virtual sub-card identifier and the Internet-of-Things data packet to the AC. The AC may perform a management operation for the Internet-of-Things sensor based on the virtual sub-card identifier and the topology of the AP and the virtual sub-card, for example, the AP determines a virtual sub-card corresponding to the Internet-of-Things data packet.

In an example, before sending the virtual sub-card identifier and the Internet-of-Things data packet to the AC, the AP performs tunnel encapsulation for the Internet-of-Things data packet (for example, a Bluetooth data packet for a Bluetooth sensor or a Zigbee data packet for a Zigbee sensor) based on a tunnel protocol between the AP and the AC, e.g., a Control And Provisioning of Wireless Access Points (CAPWAP) protocol specification. The virtual sub-card identifier is carried in the tunnel encapsulation. The AP sends the Internet-of-Things data packet to the AC through the tunnel between the AP and the AC.

In an example, an Internet-of-Things port number may further be carried in the tunnel encapsulation. The Internet-of-Things port number is used to identify that a data packet sent from the AP to the AC is the Internet-of-Things data packet, e.g., a data packet from the Internet-of-Things sensor, such that the AC processes the packet when it is determined the received data packet is the Internet-of-Things data packet based on the Internet-of-Things port number.

Further, to make the AC distinguish the Internet-of-Things data packets sent from different types of Internet-of-Things sensors (for example, a Bluetooth sensor, a Zigbee sensor and the like), sensor type information may be included in the sensor identifier when the sensor identifier is allocated by the AP, such that the AC processes the Internet-of-Things data from the different types of Internet-of-Things sensors based on the sensor type information.

Figure 2:
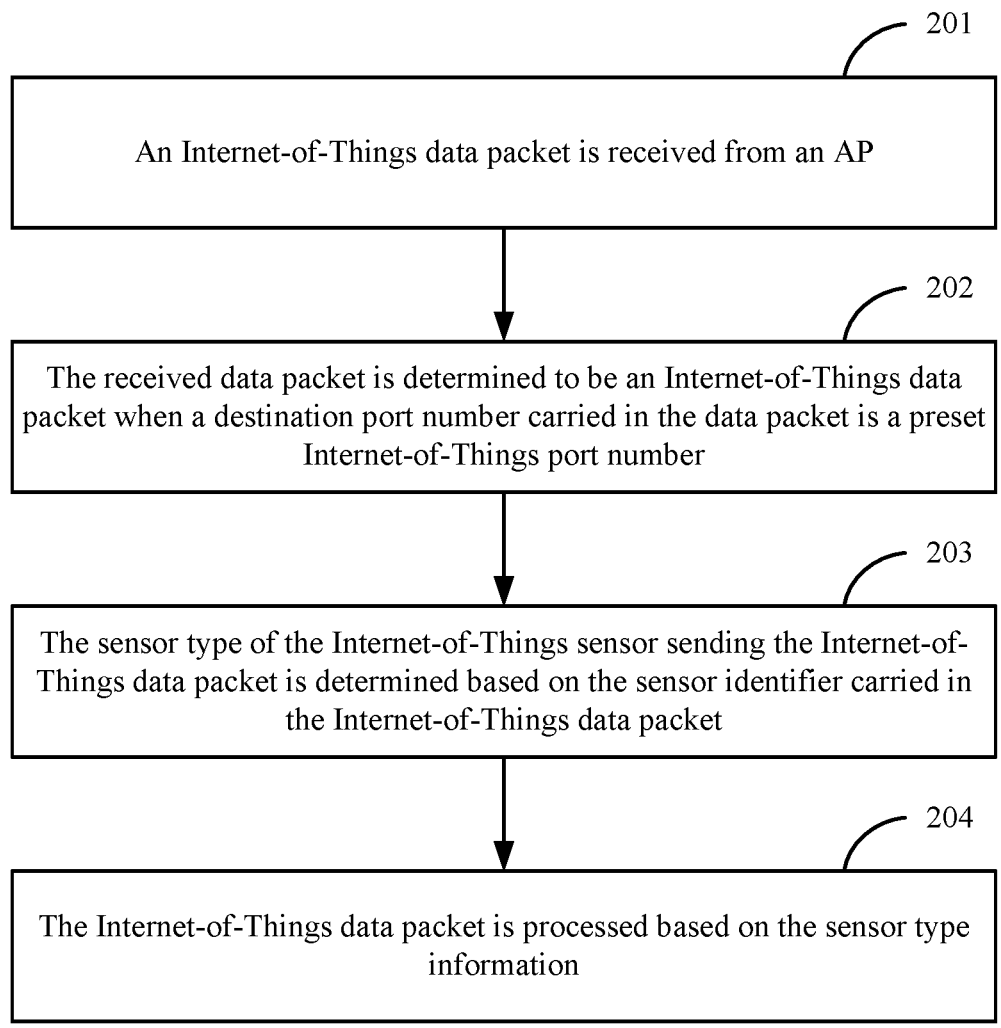
FIG. 2 is a flowchart illustrating a method of processing a packet based on an example of the present disclosure.

FIG. 2 is a flow diagram illustrating a method of processing a packet based on another example of the present disclosure. A process that the AC processes a packet is described as follow.

At block 201, an Internet-of-Things data packet is received from an AP.

At block 202, the received data packet is determined to be an Internet-of-Things data packet when a destination port number carried in the data packet is a preset Internet-of-Things port number.

A major function of the AP includes processing a WLAN signal. In an example of the present disclosure, data packets forwarded from the AP to the AC may include a WLAN data packet and an Internet-of-Things data packet.

The AC may identify that the packet is the Internet-of-Things data packet, and may process the Internet-of-Things data packet. In an example, the AC obtains a destination port number carried in the data packet (as described above, when the AP performs the tunnel encapsulation on the Internet-of-Things data packet, the Internet-of-Things port number is carried in the tunnel encapsulation), and determines the received data packet to be the Internet-of-Things data packet when the obtained destination port number is the preset Internet-of-Things port number.

At block 203, the sensor type of the Internet-of-Things sensor sending the Internet-of-Things data packet is determined based on the sensor identifier carried in the Internet-of-Things data packet.

As described above, the AP may allocate the sensor identifier for the Internet-of-Things sensor. The sensor identifier may include the sensor type information, such as a Bluetooth sensor and a Zigbee sensor. The AC obtains the sensor type information in the sensor identifier and determines the sensor type of the Internet-of-Things sensor sending the Internet-of-Things data based on the sensor type information.

At block 204, the Internet-of-Things data packet is processed based on the sensor type information.

For example, when the received Internet-of-Things data packet is determined to be the Internet-of-Things data packet from the Bluetooth sensor, the Internet-of-Things data packet is processed based on a Bluetooth protocol.

Further, the AC receives a correspondence from the AP, where the correspondence is a correspondence between a virtual sub-card identifier allocated for the Internet-of-Things sensor by the AP and an interface identifier of an interface connected with the Internet-of-Things sensor on the AP. The AC generates a topology of the AP and a virtual sub-card based on the correspondence, and performs control management for the Internet-of-Things sensor based on the virtual sub-card identifier and the topology of the AP and the virtual sub-card. For example, a command for reading a connection status of a physical sensor is sent to the AP corresponding to the virtual sub-card (corresponding to the Internet-of-Things sensor) based on the virtual sub-card identifier so as to determine whether the Internet-of-Things sensor is connected normally. The AP forwards the received command for reading the connection status of the physical sensor to the corresponding virtual sub-card based on the virtual sub-card identifier, and the virtual sub-card determines the connection status of the physical sensor and sends the connection status to the AC via the AP. In an example, a functional module of a physical sub-card is multiplexed to implement control for the Internet-of-Things sensor.

Further, the AC may upload a result of processing the Internet-of-Things data packet to a cloud server. In examples of the present disclosure, the powerful data processing capability of an AC is fully utilized to perform deep processing for Internet-of-Things data, and a data processing result is provided to the cloud server. For example, when a warning is desired based on the processing result, a warning signal is directly sent to the cloud server so as to reduce a bandwidth demand between the AC and the cloud server.

It can be seen from above, abundant hardware resources and powerful processing capabilities of the AC are fully utilized to process the Internet-of-Things data from different Internet-of-Things sensors in examples of the present disclosure such that the packet processing capability of the whole WLAN network is improved.

Figure 3:
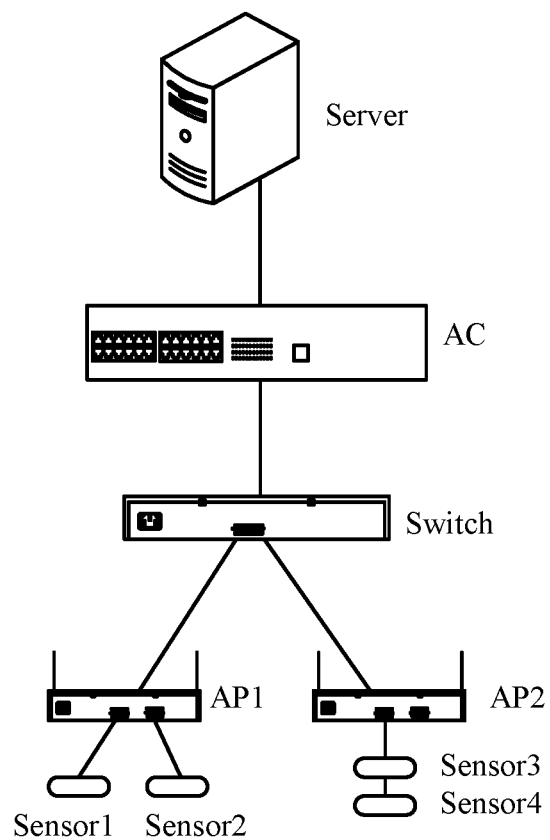
FIG. 3 is a schematic diagram illustrating an Internet of Things based on an example of the present disclosure.

An Internet of Things in FIG. 3 is taken as an example to describe the packet processing process. The Internet of Things includes a cloud Server, an AC, a Switch, APs (AP1 and AP2), and Internet-of-Things sensors (Sensor1~Sensor4). The AC is respectively connected with the APs via a CAPWAP tunnel, and the AP is respectively connected with the sensors by means of a serial bus, where the Sensor1 is connected with an interface 1 on the AP1, the Sensor2 is connected with an interface 2 on the AP1, the Sensor3 is connected with an interface 1 on the AP2; and the Sensor4 is connected with the interface 2 on the AP2. The Sensor1 and the Sensor3 are Bluetooth sensors, and the Sensor2 and the Sensor4 are Zigbee sensors.

When the Sensor1 is online, the Sensor1 initiatively sends a connection request to the AP1. After the connection is successful, the AP1 allocates a sensor identifier for the Sensor1, which is denoted as S1_L, where L represents that the current sensor is the Bluetooth sensor, and allocates a virtual sub-card identifier for the Sensor1, which is denoted as C1, and establishes a correspondence between the S1_L and the C1. Similarly, when the Sensor2 is online, the AP1 allocates a sensor identifier S2_Z for the Sensor2, where Z represents that the current sensor is the Zigbee sensor, allocates a virtual sub-card identifier C2 for the Sensor2, and establishes a correspondence between the S2_Z and the C2. When the Sensor3 is online, the AP2 allocates a sensor identifier S3_L for the Sensor3, allocates a virtual sub-card identifier C3 for the Sensor3, and establishes a correspondence between the S3_L and the C3. When the Sensor4 is online, the AP2 allocates a sensor identifier S4_Z for the Sensor4, allocates a virtual sub-card identifier C4 for the Sensor4, and establishes a correspondence between the S4_Z and the C4.

In an example, the Sensor1 sends a Bluetooth data packet. The sensor identifier S1_L allocated by the AP1 is carried in the Bluetooth data packet. After receiving the Bluetooth data packet, the AP1 queries correspondences between sensor identifiers and virtual sub-card identifiers recorded in the AP1 based to the sensor identifier S1_L carried in the packet to obtain the virtual sub-card identifier C1. CAPWAP tunnel encapsulation is performed for the Bluetooth data packet, and the encapsulated Bluetooth data packet is sent to the AC, where the virtual sub-card identifier C1 is carried in the tunnel encapsulation, and a preset Internet-of-Things port number is added into a destination port number field in the tunnel encapsulation.

After receiving the data packet from the AP1, the AC determines whether the destination port number carried in the data packet is the preset Internet-of-Things port number, and determines the received data packet to be the Internet-of-Things data packet when the destination port number carried in the data packet is the preset Internet-of-Things port number. The sensor identifier S1_L carried in the Internet-of-Things data packet is obtained, and it is determined that the sensor sending the Internet-of-Things data packet is the Bluetooth sensor based on the sensor identifier. The Internet-of-Things data packet is parsed and processed based on the Bluetooth protocol.

Further, the AP1 sends the correspondence between the virtual sub-card identifier C1 of the Internet-of-Things sensor Sensor1 and an interface identifier P1 of the interface 1 on the AP1 and the correspondence between the virtual sub-card identifier C2 of the Internet-of-Things sensor Sensor2 and an interface identifier P2 of the interface 2 on the AP2 to the AC, such that the AC generates the topologies among the AP1, the C1 and the C2 based on the correspondences above. Similarly, the AC generates the topologies among the AP2, the C3 and the C4 based on the a correspondence between the virtual sub-card identifiers C3 and the interface identifier P1 of the interface 1 of the AP2 and a correspondence between the virtual sub-card identifiers C4 and the interface identifier P1 of the interface 1 of the AP2, which are sent by the AP2. The AC may send a management command to an AP connected with the virtual sub-card based on the virtual sub-card identifier. For example, the AC may send a command of querying whether the Sensor1 is in power to the AP1 based on the virtual sub-card identifier C1.

Further, the AC may send a result of processing the Internet-of-Things data to the cloud Server.

Methods based on the present disclosure are described above. Devices based on the present disclosure are described below.

Figure 4A:
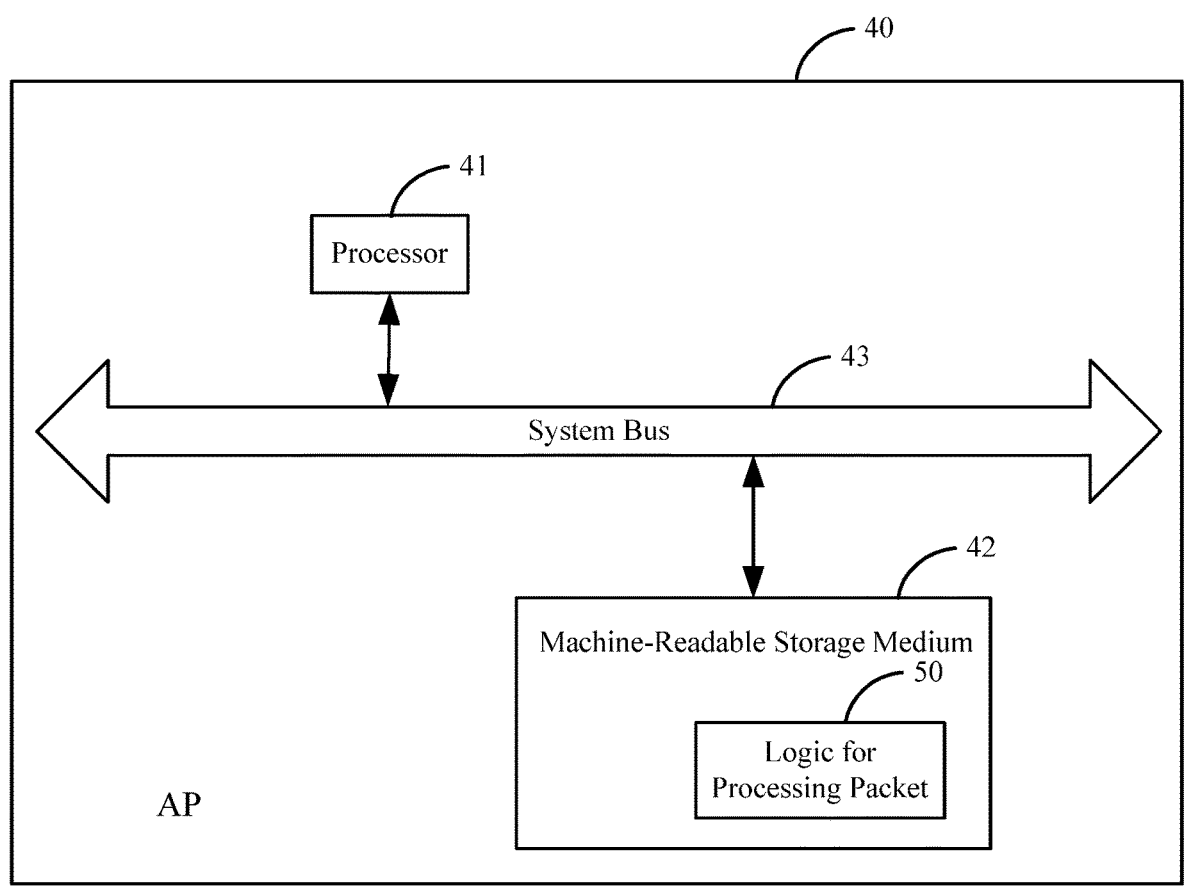
FIG. 4A is a schematic diagram illustrating a structure of an AP based on an example of the present disclosure.

FIG. 4A schematically illustrates a hardware structure diagram of an AP, which is provided by an example of the present disclosure. The AP 40 may include a processor 41 and a machine-readable storage medium 42 storing machine executable instructions. The processor 41 may communicate with the machine-readable storage medium 42 via a system bus 43, and execute the method of processing a packet described above by reading and executing the machine executable instructions corresponding to a logic of processing a packet 50 in the machine-readable storage medium 42.

As used herein, the machine-readable storage medium 42 may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof.

Figure 4B:
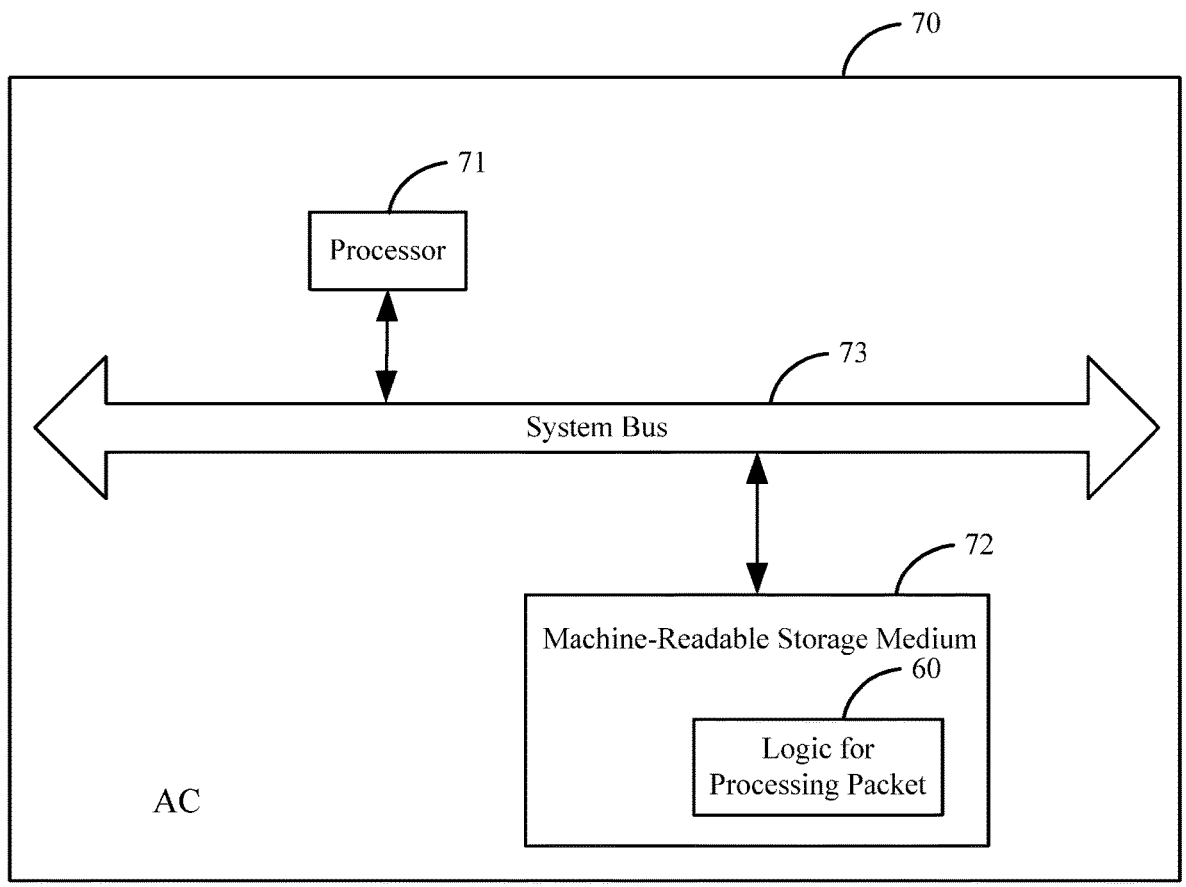
FIG. 4B is a schematic diagram illustrating a structure of an AC based on an example of the present disclosure.

FIG. 4B schematically illustrates a hardware structure diagram of an AC, which is provided by an example of the present disclosure. The AC 70 may include a processor 71 and a machine-readable storage medium 72 storing machine executable instructions. The processor 71 may communicate with the machine-readable storage medium 72 via a system bus 73, and execute the method of processing a packet described above by reading and executing the machine executable instructions corresponding to a logic of processing a packet 60 in the machine-readable storage medium 72.

As used herein, the machine-readable storage medium 72 may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof.

Figure 5:
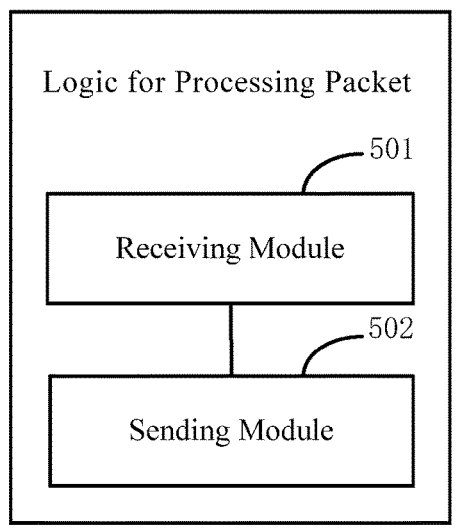
FIG. 5 is a schematic diagram illustrating a structure of logic for processing a packet based on an example of the present disclosure.

As shown in FIG. 5, functionally divided, the logic 50 for processing a packet above may include modules as follows.

A receiving module 501 is configured to receive an Internet-of-Things data packet sent by an Internet-of-Things sensor, wherein a sensor identifier of the Internet-of-Things sensor is carried in the Internet-of-Things data packet.

A sending module 502 is configured to send the received Internet-of-Things data packet to an Access Controller (AC) such that the AC processes the Internet-of-Things data packet based on the sensor identifier.

In an example, the logic further includes an allocating module.

The allocating module is configured to allocate a virtual sub-card identifier for the Internet-of-Things sensor.

The sending module 502 is further configured to send a first correspondence between the virtual sub-card identifier corresponding to the Internet-of-Things sensor and an interface identifier of an interface connected with the Internet-of-Things sensor on the AP to the AC such that the AC generates a topology of the AP and a virtual sub-card based on the first correspondence.

In an example, the logic further includes a recording module.

The recording module is configured to generate a second correspondence between the sensor identifier of the Internet-of-Things sensor and the virtual sub-card identifier corresponding to the Internet-of-Things sensor.

The sending module 502 is configured to determine a corresponding virtual sub-card identifier based on the second correspondence and the sensor identifier carried in the Internet-of-Things data packet; and send the determined virtual sub-card identifier and the Internet-of-Things data packet to the AC such that the AC performs management for the Internet-of-Things sensor based on the virtual sub-card identifier and the topology of the AP and the virtual sub-card.

In an example, the allocating module is further configured to set a destination port number of the Internet-of-Things data packet as a preset Internet-of-Things port number.

Figure 6:
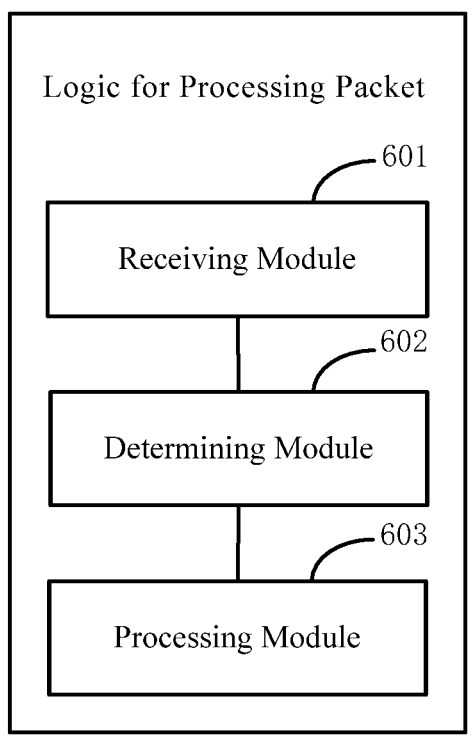
FIG. 6 is a schematic diagram illustrating a structure of logic for processing a packet based on an example of the present disclosure.

As shown in FIG. 6, functionally divided, the logic 60 for processing a packet above may include modules as follows.

A receiving module 601 is configured to receive an Internet-of-Things data packet from an AP.

A determining module 602 is configured to determine a sensor type of an Internet-of-Things sensor sending the Internet-of-Things data packet based on a sensor identifier carried in the Internet-of-Things data packet A processing module 603 is configured to process the Internet-of-Things data packet based on the sensor type.

In an example, the receiving module 601 is configured to receive a data packet from the AP; and determine the received data packet to be the Internet-of-Things data packet when a destination port number carried in the data packet is a preset Internet-of-Things port number.

Further, the logic further includes a generating module.

The generating module is configured to receive a correspondence between a virtual sub-card identifier corresponding to the Internet-of-Things sensor and an interface identifier of an interface connected with the Internet-of-Things sensor on the AP, and generate a topology of the AP and a virtual sub-card based on the correspondence.

Further, the device further includes an uploading module.

The uploading module is configured to upload a result of processing the Internet-of-Things data packet based on the sensor type to a cloud server.

Details of the implementation process of the functions and effects of different modules in the above-described device may be seen from the implementation process of corresponding blocks in the above-described method, which will not be redundantly described herein.

Since the device embodiments substantially correspond to the method embodiments, a reference may be made to part of the descriptions of the method embodiments for the related part. The device embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and a device provided according to the embodiments of the present disclosure. Specific examples are used herein to set forth the principles and the implementation of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method of processing a packet, the method comprising:
   receiving, by an Access Controller (AC), an Internet-of-Things data packet from an Access Point (AP);
   determining, by the AC, a sensor type of an Internet-of-Things sensor sending the Internet-of-Things data packet based on a sensor identifier carried in the Internet-of-Things data packet; and
   processing, by the AC, the Internet-of-Things data packet based on the sensor type;
   receiving, by the AC from the AP, a correspondence between a virtual sub-card identifier corresponding to the Internet-of-Things sensor and an interface identifier of an interface connected with the Internet-of-Things sensor on the AP, and generating a topology of the AP and a virtual sub-card based on the correspondence.

2. The method according to claim 1, wherein receiving the Internet-of-Things data packet from the AP comprises:
   receiving, by the AC, a data packet from the AP; and determining, by the AC, the received data packet to be the Internet-of-Things data packet when a destination port number carried in the data packet is a preset Internet-of-Things port number.

3. The method according to claim 1, further comprising:
   uploading, by the AC, a result of processing the Internet-of-Things data packet based on the sensor type to a cloud server.

4. An Access Controller (AC), comprising:
   a processor, and
   a non-transitory machine-readable storage medium storing machine executable instructions which are executable by the processor to:
   receive an Internet-of-Things data packet from an Access Point (AP);
   determine a sensor type of an Internet-of-Things sensor sending the Internet-of-Things data packet based on a sensor identifier carried in the Internet-of-Things data packet; and
   process the Internet-of-Things data packet based on the sensor type;
   receive from the AP a correspondence between a virtual sub-card identifier corresponding to the Internet-of-Things sensor and an interface identifier of an interface connected with the Internet-of-Things sensor on the AP, and generate a topology of the AP and a virtual sub-card based on the correspondence.

5. The AC according to claim 4, wherein the processor is caused by the machine-executable instructions further to:
   receive a data packet from the AP; and
   determine the received data packet to be the Internet-of-Things data packet when a destination port number carried in the data packet is a preset Internet-of-Things port number.

6. The AC according to claim 4, wherein the processor is caused by the machine-executable instructions further to:

upload a result of processing the Internet-of-Things data packet based on the sensor type to a cloud server.

7. A non-transitory machine-readable storage medium storing machine executable instructions which are invoked and executed by a processor to execute the method of processing a packet according to claim 1.

* * * * *